W. H. THOMS & H. W. DUMMERT.
JOURNAL BEARING.
APPLICATION FILED NOV. 25, 1910.

1,011,094.

Patented Dec. 5, 1911.

Witnesses.
René A. Pigeon
B. A. Lennhack

Inventors.
W. H. Thoms & H. W. Dummert
by
Atty.

UNITED STATES PATENT OFFICE.

WILLIAM HENRY THOMS AND HORACE WALTER DUMMERT, OF CARLETON PLACE, ONTARIO, CANADA.

JOURNAL-BEARING.

1,011,094.      Specification of Letters Patent.      Patented Dec. 5, 1911.

Application filed November 25, 1910. Serial No. 594,191.

*To all whom it may concern:*

Be it known that we, WILLIAM HENRY THOMS and HORACE WALTER DUMMERT, of Carleton Place, in the county of Carleton, in the Province of Ontario, in the Dominion of Canada, having invented certain new and useful Improvements in Journal-Bearings, do hereby declare that the following is a full, clear, and exact description of the same.

The invention relates to improvements in journal bearings, as described in the present specification and illustrated in the accompanying drawings that form part of the same.

The invention consists essentially in the novel construction and arrangement of parts whereby the bushing is adjustable and detachable.

The objects of the invention are to provide a journal box in which the journal bearings may be removed and adjusted to fit the axle of the locomotive, without removing the wheel, which means a great saver of time, to provide a journal box that will be air cooled and thus prevent the brasses from over heating, and to provide a cheap, simple and durable construction.

Figure 1:
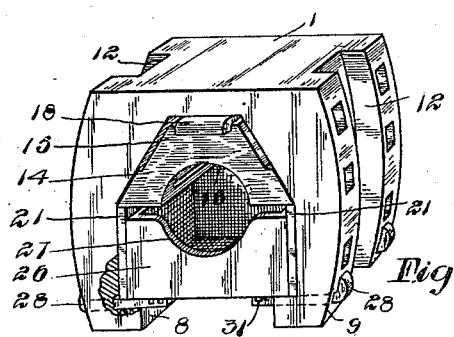
Figure 6:
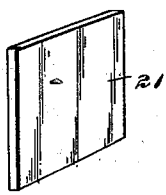
Figure 4:
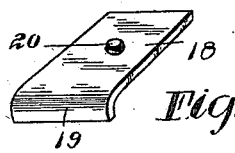
Figure 2:
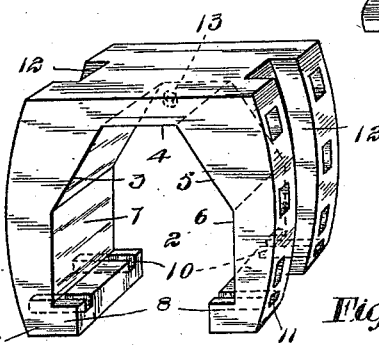
Figure 7:
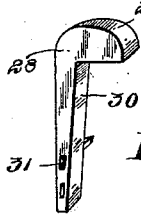
Figure 3:
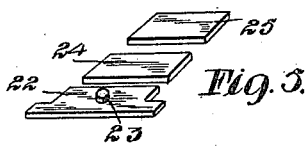
Figure 5:
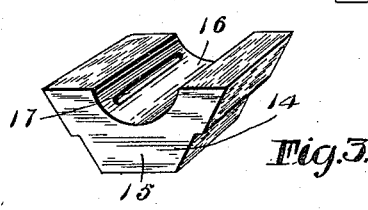

In the drawings, Figure 1 is a perspective view of the journal box and journal bearings. Fig. 2 is a perspective view of the journal box only, the oil well and journal bearing having been removed. Fig. 3 is a perspective view of a journal bearing. Fig. 4 is an enlarged perspective view of the adjusting liner. Fig. 5 is a perspective view of another form of a liner. Fig. 6 is an enlarged perspective view of an equilibrating plate. Fig. 7 is an enlarged perspective view of a locking pin.

Like numerals of reference indicate corresponding parts in each figure.

Referring to the drawings, 1 is the journal block having the journal opening 2 therethrough formed of the polygonal sides 3, 4, 5, 6 and 7 and the inwardly extending flanges 8 from the lower ends of the outer sides 9, said flanges having the grooves 10 therein, leading from the squared holes 11 through said outer sides 9, each of the outer sides 9 is preferably arc-shaped and has the central vertical groove 12 therein arranged. The wall of the side 4 has a central pin hole 13 leading thereinto.

14 is a bushing or brass forming the journal bearing and in shape corresponding to the sides 3, 4 and 5 of the journal opening 2 and having the reduced upper end 15 and the shaft recess 16 in its under side, the latter having longitudinal grooves 17 forming oil recesses.

18 is a liner in the form of a short plate having a downwardly bent outer end 19 and a pin 20 projecting upwardly from its top surface and rigid with the plate, said pin fitting into the pin hole 13 in the wall of the side 4.

The bushing 14 is fitted into the block 1 within the sides 3, 4 and 5 and up against the plate 18.

21 are distance plates arranged between the lower side of the bushing 14 and the flanges 8. The plates 21 will preserve the equilibrium of the bushing 14 and prevent the same from turning on the axle.

Another form of liner plate is used, as illustrated in Fig. 5, in which 22 is the outer section of the liner plate, preferably formed in T-shape and having the pin 23 projecting upwardly therefrom. 24 and 25 are the other sections, the principal difference between this liner plate and the liner plate 18 being that one is sectional construction and the other in one piece.

26 is the oil well having the shaft recess 27 at each end thereof and fitting in the space in said block 1 beneath the bushing 14 and resting on the flanges 8.

28 are pins inserted through the holes 11 and the grooves 10 and having the fangs 29 and the wedge-shaped shanks 30, said shanks extending under and engaging said oil well 26.

31 are cotter pins extending through suitable holes in the shanks 30 holding said pins 28 in position.

In the use of this invention, the axle is inserted through the shaft orifices formed by the recess in the bushing and the recesses in the ends of the oil box and turns in said bearing, the weight of the vehicle bringing the lower end of the bushing 14 snugly around said shaft. The upper end of the bushing jams against the plate 18 and thus prevents too great an inward strain on the lower end of said bushing. As the wall of the shaft recess in the bushing wears down, the plate 18 is removed and a thinner plate of exactly the same construction replaces the one removed, so that the lower end of said bushing is brought around the shaft by the weight of the vehicle as hereinbefore explained.

In the liner shown in Fig. 5, the section form of plate is used, where there are obstructing pieces of machinery which will prevent the removal of the full length of plate.

In this invention, the repairs to the bearings are done in a very simple manner, as it will be seen that the bushings or brasses are readily removed from the journal boxes and the said bushings will accommodate themselves to the periphery of the shaft according to the thickness of the liner plate, therefore, in place of it taking weeks to do repairs to the bearings of such a vehicle as a locomotive, it may readily be accomplished in the space of a few hours.

An important feature of this invention is the converging walls of the journal opening and the reduced upper end of the bushing. The reducing of the upper end of the bushing provides an abutment only at the lower end against said converging sides. Therefore, when owing to the bushing wearing, a thinner liner plate is inserted, the weight of the vehicle on the journal block will squeeze in the lower part of the bushing where it contacts said converging walls to better accommodate it to the axle or shaft, that is to say, make a perfect fit therearound.

What we claim as our invention is:

1. In an axle bearing, a journal block partially supporting the weight of the vehicle and having upwardly converging side walls in the upper portion of the journal opening and inwardly extending flanges at the bottom of said openings, a bushing having an axle groove in the under side thereof and outer sides stepped intermediate of their length forming lower end abutments meeting said block converging walls intermediate of their length, a bearing piece of suitable thickness having a bent over outer end and a pin projecting upwardly therefrom intermediate of its length, said plate being positioned between the top of the bushing and the upper inner wall of the block and said pin fitting into a corresponding hole through said upper inner wall, and an oil well inserted into the journal opening beneath the bushing and resting on the inwardly turned flanges aforesaid.

2. In a device of the class described, in combination, a journal block having vertically grooved sides, a journal opening therethrough of polygonal shape, flanges extending inwardly from the bottom of said opening and holes through the sides leading to grooves across said flanges, a bushing having a reduced upper end and of corresponding shape to the upper sides of said polygonal journal opening, a liner plate having a suitable head, and a pin projecting upwardly therefrom into a corresponding hole in the upper side of said polygonal opening, an oil well beneath said bushing, distance plates behind said oil well between said bushing and said flange and pins of wedge shape inserted through said holes and grooves beneath said oil well and suitably fastened at their under sides.

Signed at Carleton Place, this 17th day of November 1910.

WILLIAM HENRY THOMS.
HORACE WALTER DUMMERT.

Witnesses:
HARRIET H. McNEELY,
J. S. L. McNEELY.

---

Copies of this patent may be obtained for five cents each, by addressing the "Commissioner of Patents, Washington, D. C."